Figure 1:
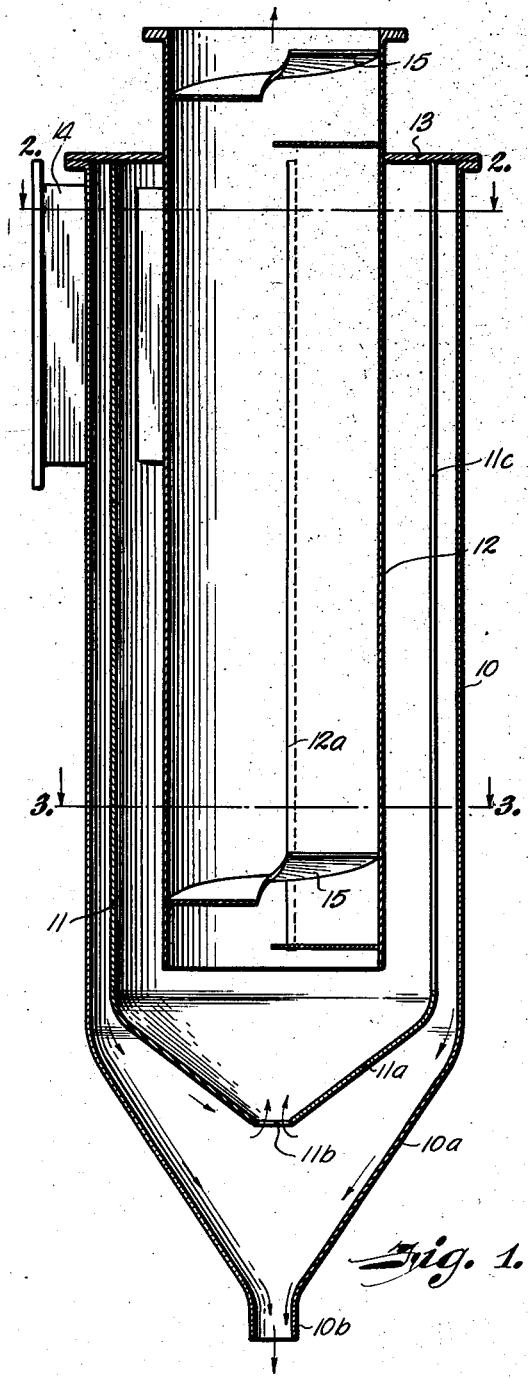

June 7, 1949. D. H. PUTNEY 2,472,777
TRIPLE TUBE CYCLONE SEPARATOR
Filed Feb. 28, 1947

INVENTOR.
David H. Putney
BY
ATTORNEY.

Patented June 7, 1949

2,472,777

UNITED STATES PATENT OFFICE 2,472,777

TRIPLE TUBE CYCLONE SEPARATOR

David H. Putney, Kansas City, Mo., assignor to Stratford Development Corporation, Kansas City, Mo., a corporation of Delaware Application February 28, 1947, Serial No. 731,504

2 Claims. (Cl. 183—83)

This invention relates to a method and apparatus for separating finely divided solid particles or dust from gaseous material such as gas or vapor, and refers more particularly to a separator of the cyclone type employing an outer shell and two inner concentric tubes, the inner tube open ended at top and bottom, the outer shell and intermediate tube or vessel closed at the top and having constricted openings at their bottoms, an inlet for introducing the gaseous material tangentially near the top of the intermediate tube and a discharge for gases at the top of the inner tube and for solids at the bottom of the outer shell.

In the art of separating dust, ash, or finely divided solids from air, gas or vapor, the principle of centrifugal separation is well known and cyclone type separators utilizing this principle are widely used. However, the separating efficiency of such centrifugal separators is frequently so low that it is necessary to supplement them with secondary separators such as magnetic separators, filters, scrubbers or electrical precipitators. An example of this is the current practice followed in catalytic conversion processes such as fluid catalytic cracking of hydrocarbons where cyclone type separators are employed for removing the finely divided catalyst dust from the vapors leaving the reactor, and from the flue gas leaving the generator. The separating efficiency of such separators usually runs between 85% and 95% and the loss of catalyst in the effluent from the separators would be many tons per day if secondary separating means were not employed. It is conventional practice to scrub the hydrocarbon vapor leaving the reactor cyclone separators with heavy hydrocarbon oil in baffle or bubble towers to recover the catalyst fines in a slurry, the disposal of which is troublesome and expensive. The effluent from the catalyst regenerator cyclone separators is usually passed to an electrical precipitator or other secondary separating device which represents a considerable capital investment and a constant operating expense.

An object, therefore, of this invention is to provide a method and apparatus employing the centrifugal principle of the cyclone type separator which have improved efficiency as compared to all presently known cyclone type designs.

Another object is to provide a separator which will in most cases handle the entire dust recovery job without the necessity of secondary or "clean up" equipment.

A further object is to provide a highly efficient separator of very simple design and low cost.

Other and further objects will appear from the following description.

In the accompanying drawings which form a part of the instant specification and are to be read in conjunction therewith, and in which like reference numerals indicate like parts in the various views, there is shown a separator embodying the invention.

Figure 2:
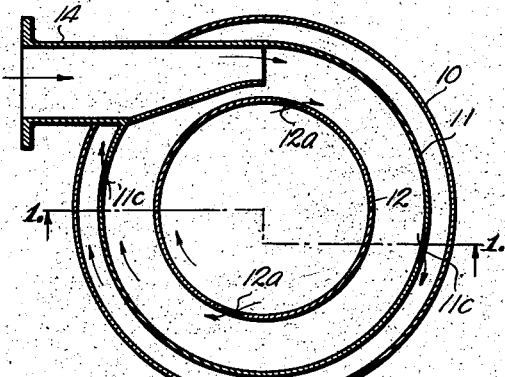
Figure 3:
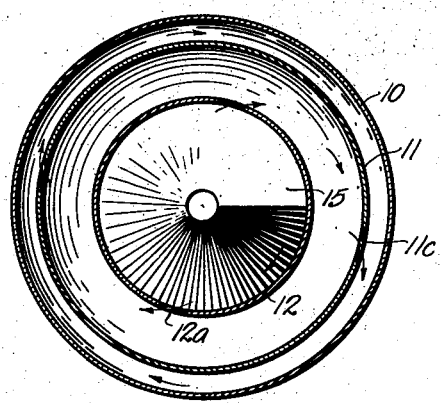
Figure 4:
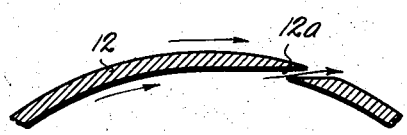

Fig. 1 is a vertical section taken along the line 1—1 in Fig. 2 in the direction of the arrows, Fig. 2 is a view taken along the line 2—2 in Fig. 1 in the direction of the arrows, Fig. 3 is a view taken along the line 3—3 in Fig. 1 in the direction of the arrows, and Fig. 4 is an enlarged sectional view detailing the ports or passageways through the walls of the inner and intermediate tubes.

The separator comprises an outer shell 10 having a conical bottom 10a terminating in a solids discharge pipe 10b. Within the outer shell and concentric therewith is an intermediate skimming tube or vessel 11, also tapered at the bottom as shown at 11a with a bottom opening or port 11b through which gases from the annular space be-between the shell and intermediate tube pass. Within the outer and intermediate tubular vessels 10 and 11 is a draft tube 12. This inner draft tube is open ended at top and bottom, the upper end extending above the top of the intermediate and outer vessels in the form of a flanged extension to which an outlet conveyor pipe is coupled. The outer and intermediate vessels are closed at the top by means of an annular plate 13 welded, bolted or otherwise affixed to the top of the vessels to assure pressure tight closure.

Penetrating the walls of the intermediate and inner vessels 11 and 12 are slotted openings 11c and 12a. These slotted openings or passageways may be of any desired length and arranged in the walls of the respective vessels at desired intervals. The slotted passageways preferably penetrate the walls of the tubular vessels at tangents to the inner surfaces of the vessels and in the direction of rotation of the gaseous materials within the vessels. In the drawing the slots in the draft or inner tube extend substantially the length of the tube within the outer shell. Those in the intermediate vessel on one side extend the length of the vertical wall within the shell and on the other side from below the inlet opening to the bottom of the vertical wall.

An inlet 14 is connected tangentially into the intermediate vessel so the gaseous material containing entrained solids is charged tangentially into the upper portion of the annular space between the intermediate tubular vessel and inner draft tube. In the top and bottom of the inner tube may be located spiral baffles 15.

In operation, the dust laden gas enters through duct 14 and is discharged tangentially between tubes 11 and 12, thus imparting rotation to the gas stream so that it descends in a spiral path down between the two tubular vessels. The centrifugal force applied to the dust or solid particles in the stream by the rotation of the mass causes them to move to the periphery of the stream and be thrown against the inside of tube 11. The solids thus separated slide around the wall of tube 11 in a spirally descending path until they come to one of the slots 11c. These slots being cut tangentially to the inside wall of tube 11 offer a break in the resistance being applied to the dust hugging the wall and permit it to leave the tube in substantially a tangential path and enter the annular space between tubes 11 and 10.

It is well known in the art that the static pressure at the center or core of a cyclone type separator is lower than the pressure at the periphery. The pressure at the slots 11c and 12a is greater than the pressure at the center or core. An orifice or opening 11b has been provided at the bottom of the conical end of the intermediate tubular vessel 11. Since the pressure at slots 11c is greater than the pressure just above the orifice 11b, there is a flow of gas out through slots 11c down the annular space between tube 10 and 11 and upward through orifice 11b. The quantity of this gas flow can be readily fixed by proper selection of orifice 11b or it may be varied at will by providing an oversized orifice opening and throttling it by means of a movable plug or cover plate not shown. Some flow of gas is necessary in order to serve as a carrying medium for the dust discharged from the slots 11c and to maintain a rotative velocity in the space between tubes 10 and 11 so the separated dust will be forced to the inside wall of tube 10 and descend in a spiral path. However, an excessive amount of gas flow between tubes 10 and 11 causes turbulence between the conical bottoms 10a and 11a of the respective vessels so that some of the separated dust passing down the wall of conical bottom 10a is drawn upwardly therefrom and returned through orifice 11b. It is desirable to prevent this recycle of separated solids.

The portion of total feed gas which is passed through slots 11c and orifice 11b should preferably be less than 25% of the total gas passing through the separator, although the apparatus will still function and show separation better than that of previously used cyclones even if 100% of the feed gas is forced through slots 11c by extending and joining tube 12 to the conical end 11a of the intermediate vessel.

The slots 12a in tube 12 are substantially tangential to the inner wall thereof, thus making it possible to utilize the impact velocity against the inside of the slots and the inductive effect of the gas velocity passing outside of the slots to overcome the pressure drop through the annular space between tubes 12 and 11 and the drop through tube 12 to the point of exit of the gas through slots 12a. This reestablishes a flow of gas through slots 12a from the tube 12 into tube 11 emerging from slots 12a with rotation in the same direction as the main gas flow between the two tubes.

The rotation of the gas stream in tube 12 results in a further centrifugal separation of dust particles which escape separation in the primary separating zone. As demonstrated by actual tests, these separated dust particles are thrown to the wall of tube 12 and rise along it in an ascending spiral path until they come to one of the slots 12a. Upon arrival at the slotted opening, the wall of the tube no longer exerts centripetal pressure upon them and they slide freely through the slot in tangential paths along with that portion of the gas which recycles through the slots.

The width of the slotted openings or passageways is made small to eliminate as much recycled gas as possible and still freely pass the separated solids. It is not necessary to rely on the quantity and velocity of gas leaving slots 12a to maintain rotative velocity in the annular space between tubes 12 and 11 since the rotative velocity in that zone is maintained by the main gas feed stream. The dust or finely divided solid particles which are separated in tube 12 are returned through slots 12a to the primary separating zone, thus increasing the dust load to that zone and making possible the separation of a greater quantity of solids therefrom, and increasing the separating efficiency over that which can be obtained without the slots in the draft tube 12.

Thus it will be seen that there has been provided a primary separating zone in which the gas-solids mixture has been separated into two fractions, (a) a fraction consisting of most of the solids and a small portion of the gas and (b) a fraction consisting of most of the gas and that portion of the solids which escape centrifugal separation in this zone; a secondary separating zone from the core of which the gas portion of fraction (a) is withdrawn and from the bottom of which the solids portion is discharged; a third separating zone which takes fraction (b) plus the gas from the second separating zone and by virtue of decreased radius of rotation and/or increased rotative velocity applies to the finer remaining solids centrifugal force greater than that applied in the first two separating zones to effect a final separation of extremely fine solids from the effluent gas.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the drawings is to be interpreted as illustrative and not in a limiting sense.

I claim:

1. A separator for removing entrained solid particles from gaseous materials comprising three vertical concentric vessels, the inner vessel open-ended at top and bottom, the top opening constituting a gas discharge outlet, the two outer vessels closed at the top and tapered at the bottom to form restricted bottom openings in the respective vessels, said openings in spaced relation below the bottom opening of the inner vessel, an inlet connected tangentially into the upper portion of the intermediate vessel for introducing gases and entrained solids to the space between the inner and intermediate vessels, an outlet for the removal of solids at the bottom of the outer vessel, and slotted passageways in the walls of the inner and intermediate vessels for removing solids from the gaseous materials passing respectively therethrough.

2. A separator for removing entrained solid particles from gaseous materials comprising three vertical concentric vessels, the inner vessel open-ended at top and bottom, a spiral baffle within said inner vessel and the top opening of the inner vessel constituting a gas discharge outlet, the two outer vessels closed at the top and tapered at the bottom to form restricted bottom openings in the respective vessels, said openings in spaced relation below the bottom opening of the inner vessel, an inlet connected tangentially into the upper portion of the intermediate vessel for introducing gases and entrained solids to the space between the inner and intermediate vessels, an outlet for the removal of solids at the bottom of the outer vessel, and slotted passageways in the walls of the inner and intermediate vessels for removing solids from the gaseous materials passing respectively therethrough.

DAVID H. PUTNEY.

REFERENCES CITED

The following references are of record in the file of this patent:

UNITED STATES PATENTS

| Number | Name | Date |
|---|---|---|
| 1,573,135 | Bourne et al. | Feb. 16, 1926 |
| 1,721,908 | Heist | July 23, 1929 |
| 2,284,513 | Coward | May 26, 1942 |
| 2,349,831 | Osgood | May 30, 1944 |

FOREIGN PATENTS

| Number | Country | Date |
|---|---|---|
| 329,779 | Germany | Nov. 29, 1920 |